United States Patent [19]

Takeuchi

[11] Patent Number: 5,201,305

[45] Date of Patent: Apr. 13, 1993

[54] BRITTLE MATERIAL CUTTING METHOD

[75] Inventor: Noriyuki Takeuchi, Kanagawa, Japan

[73] Assignee: Nippei Toyama Corporation, Tokyo, Japan

[21] Appl. No.: 795,256

[22] Filed: Nov. 19, 1991

Related U.S. Application Data

[63] Continuation of Ser. No. 629,163, Dec. 19, 1990, abandoned, which is a continuation of Ser. No. 447,338, Dec. 7, 1989, abandoned.

[51] Int. Cl.$^5$ .............................................. B28D 1/08
[52] U.S. Cl. ................................ 125/21; 125/16.01; 125/16.02
[58] Field of Search ................. 125/21, 16.01, 16.02, 125/18, 19; 51/7, 59 SS, 317, DIG. 11; 83/647, 651.1

[56] References Cited

U.S. PATENT DOCUMENTS

| | | | |
|---|---|---|---|
| 3,400,494 | 9/1968 | Seitz | 125/21 |
| 3,525,324 | 8/1970 | Bonnefoy et al. | 125/16.01 |
| 3,831,576 | 8/1974 | Mech | 125/21 |
| 4,004,325 | 6/1977 | Wieck | 51/DIG. 11 |
| 4,004,375 | 1/1977 | Wieck | 51/DIG. 11 X |
| 4,105,012 | 8/1978 | Hini et al. | 125/16.01 |
| 4,160,439 | 7/1979 | Piat | 125/16.01 |
| 4,655,191 | 4/1987 | Wells et al. | |
| 4,766,875 | 8/1988 | Feigelson | 125/21 |

FOREIGN PATENT DOCUMENTS

| | | |
|---|---|---|
| 1121871 | 6/1986 | Japan . |
| 63-11273 | 1/1988 | Japan . |
| 63-260756 | 10/1988 | Japan . |
| 63-260757 | 10/1988 | Japan . |
| 1316162 | 12/1989 | Japan . |
| 665380 | 5/1988 | Switzerland . |
| 157204 | 9/1962 | U.S.S.R. .......... 51/DIG. 11 |
| 548960 | 10/1942 | United Kingdom ......... 51/DIG. 11 |
| 1158459 | 7/1969 | United Kingdom . |
| 8901395 | 2/1989 | World Int. Prop. O. . |

Primary Examiner—Bruce M. Kisliuk
Assistant Examiner—John A. Marlott
Attorney, Agent, or Firm—Sughrue, Mion, Zinn, Macpeak & Seas

[57] ABSTRACT

In a method of cutting a workpiece of brittle material with a wire by using a machining solution containing abrasive grains, the workpiece is pushed against the wire from above, and a machining solution pooling vessel is disposed below the workpiece, to immerse the cut portion of the workpiece in the machining solution in the vessel, and an ultrasonic oscillator is provided for the machining solution pooling vessel to apply ultrasonic waves to the machining solution during machining, whereby difficulties that the machined surface is scratched or cracked by the abrasive grains, and the machining solution is deteriorated in cutting capacity are eliminated, and the machining accuracy and efficiency are improved.

3 Claims, 4 Drawing Sheets

BRITTLE MATERIAL CUTTING METHOD

This is a continuation of application No. 07/629,163 filed Dec. 19, 1990, now abandoned, which was a continuation of application Ser. No. 07,447,338 filed Dec. 7, 1989 now abandoned.

BACKGROUND OF THE INVENTION

This invention relates to a wire saw device for cutting a brittle material, and more particularly to a method of preventing a machining solution from staying and sticking at the machined part of a workpiece, and a method of preventing a machining solution from being deteriorated in machining capacity.

One example of a conventional method of cutting a brittle material such as semiconductor materials, magnetic materials, ceramics and glass is as follows: A wire and a brittle material to be machined (hereinafter referred to as "a workpiece", when applicable) are abutted against each other with a machining solution interposed therebetween, and, under this condition, while they are reciprocated relative to each other, the brittle material is lapped with abrasive grains in the machining solution.

In the conventional method, the wire is pushed by the workpiece from below. As shown in FIG. 1, a wire 1 is wound over a plurality of grooved rollers 2 (for instance three rollers) several turns with a predetermined pitch, and the wire 1 thus laid is reciprocated straightly while the workpiece 3 is pushed against the wire 1. In this operation, a plurality of nozzles 4 held above the workpiece 3 jet a machining solution 5 to the workpiece 3, so that the latter 3 is cut by the abrasive grains in the machining solution 5.

In the method, as shown in FIG. 2, a wedge-shaped space 10 is formed between the wire 1 and the workpiece 3 downstream of the wire 1 as viewed in the direction of movement of the wire 1. The wedge-shaped space 10 is located below the wire 1, and therefore it is rather difficult for the machining solution 5 to go into the space 10. On the other hand, the abrasive grains may stay in and stick to the gaps between the machined parts of the workpiece 3, and the thin plates formed may incline. As a result, when the workpiece 3 is disengaged from the wire 1 after machined, the machined surface may be scratched or cracked by the wire 1. In order to overcome this difficulty, the workpiece 3 machined is washed with cleaning oil for a long period of time; however, it is impossible to completely remove the abrasive grains from the gaps, and therefore it is impossible to completely prevent the machined surfaces from being scratched or cracked. In the washing operation, the cleaning solution is mixed with the machining solution 5, thus reducing the service life of the latter 5.

In view of the foregoing, in order to positively supply the machining solution 5 to a cutting part of the workpiece, a method of machining a workpiece in a machining-solution supplying vessel 6 as shown in FIG. 3 has been proposed in the art. In the method, the machining solution 5 is sufficiently supplied to the cutting part of the workpiece, thus preventing the abrasive grains from staying in and sticking to the gaps between the machined parts of the workpiece. However, the method is still disadvantageous in that it is rather troublesome to lay the wire 1 over the rollers and to set the workpiece 3 at the machining position, and the thin plates formed by cutting are liable to incline, and the inclination of the thin plates cannot be positively prevented.

U.S. Pat. No. 4,655,191 to Wells et al has disclosed a method of cutting a workpiece with a wire from below. In the method, the machining solution will flows sufficiently into the wedge-shaped space. However, the method is also disadvantageous in the following point: The gaps formed in the workpiece by machining provide passages for the machining solution; that is, the gaps are not positively immersed in the machining solution pooled. Therefore, the abrasive grains are liable to stay in and stick to the gaps. Accordingly, in removing the wire from the workpiece, it may scratch or crack the machined surface.

SUMMARY OF THE INVENTION

Accordingly, an object of this invention is to eliminate the above-described difficulties accompanying a conventional brittle material machining method.

More specifically, an object of the invention is to provide a brittle material machining method in which a machining solution is sufficiently applied to a machining part of a workpiece, in removing a wire from the workpiece the machined surface is prevented from being scratched or cracked, the machining solution is prevented from deterioration in machining capacity, and the machining operation can be achieved with high efficiency and high accuracy.

The foregoing object and other objects of the invention have been achieved by the provision of a method of cutting a workpiece of brittle material in which a wire is supplied from a wire supply reel, wound over a plurality of grooved rollers, and wound on a wire take-up reel, and while, between the grooved rollers, the wire and a workpiece of brittle material are pushed against each other, a machining solution containing abrasive grains is supplied to the workpiece, to cut the workpiece; in which, according to the invention, the workpiece is pushed against the wire from above, and a machining solution pooling vessel is provided below the workpiece to immerse the cut portion of the workpiece in the machining solution therein, and an ultrasonic device is provided for the machining solution 5 disposed below the workpiece to apply ultrasonic waves to the machining solution during machining.

According to the method of the invention, the abrasive grains are allowed to sufficiently go into the wedge-shaped spaces which are formed between the wire and the workpiece alternately at both ends of the cutting portion, with the result that the machining accuracy and efficiency are improved. Furthermore, the workpiece is suspended over the wire, and therefore the workpiece will never be inclined. In addition, the machined portion is kept immersed in the machining solution, the difficulty that the abrasive grains stay in and stick to the gaps in the machined portion of the workpiece can be positively prevented.

The nature, principle and utility of the invention will become more apparent from the following detailed description when read in conjunction with the accompanying drawings, in which like parts are designated by like reference numerals.

DETAILED DESCRIPTION OF THE INVENTION

Figure 1:
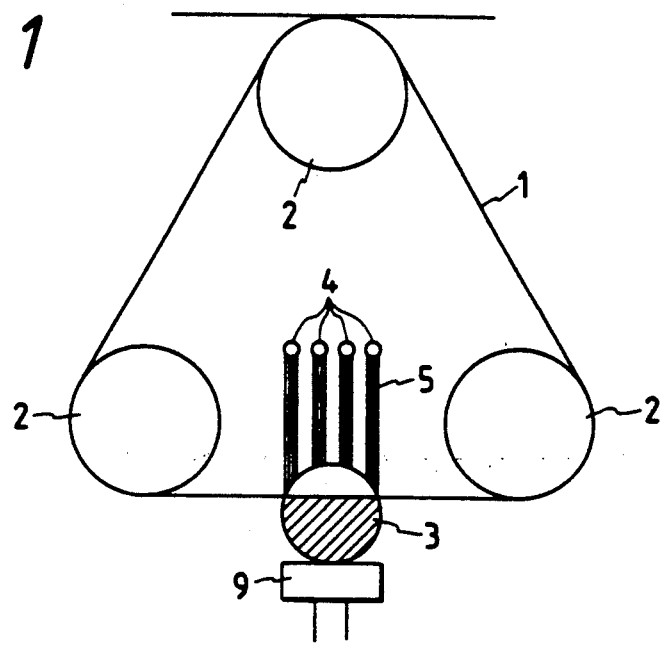
FIGS. 1 and 3 are diagrams for a description of the principle of a conventional method of cutting a workpiece of brittle material.
Figure 2:
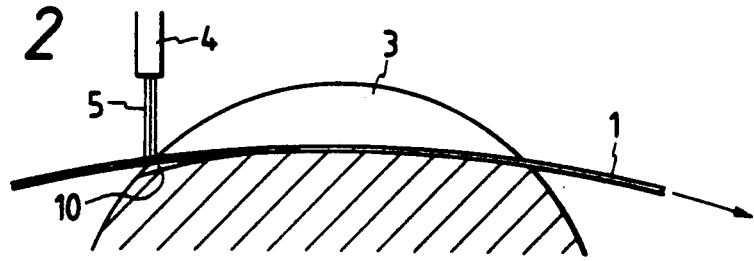
FIG. 2 is an enlarged view showing a portion of a workpiece which is cut according to the conventional method.
Figure 3:
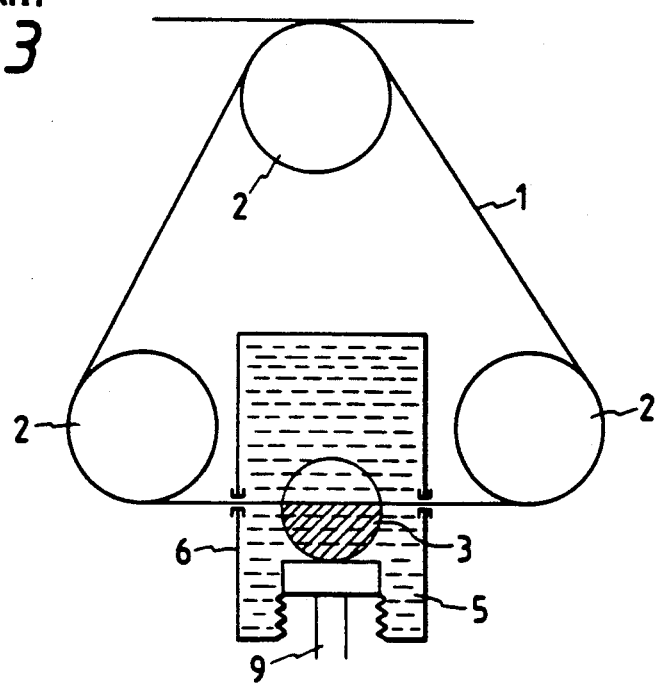
Figure 4:
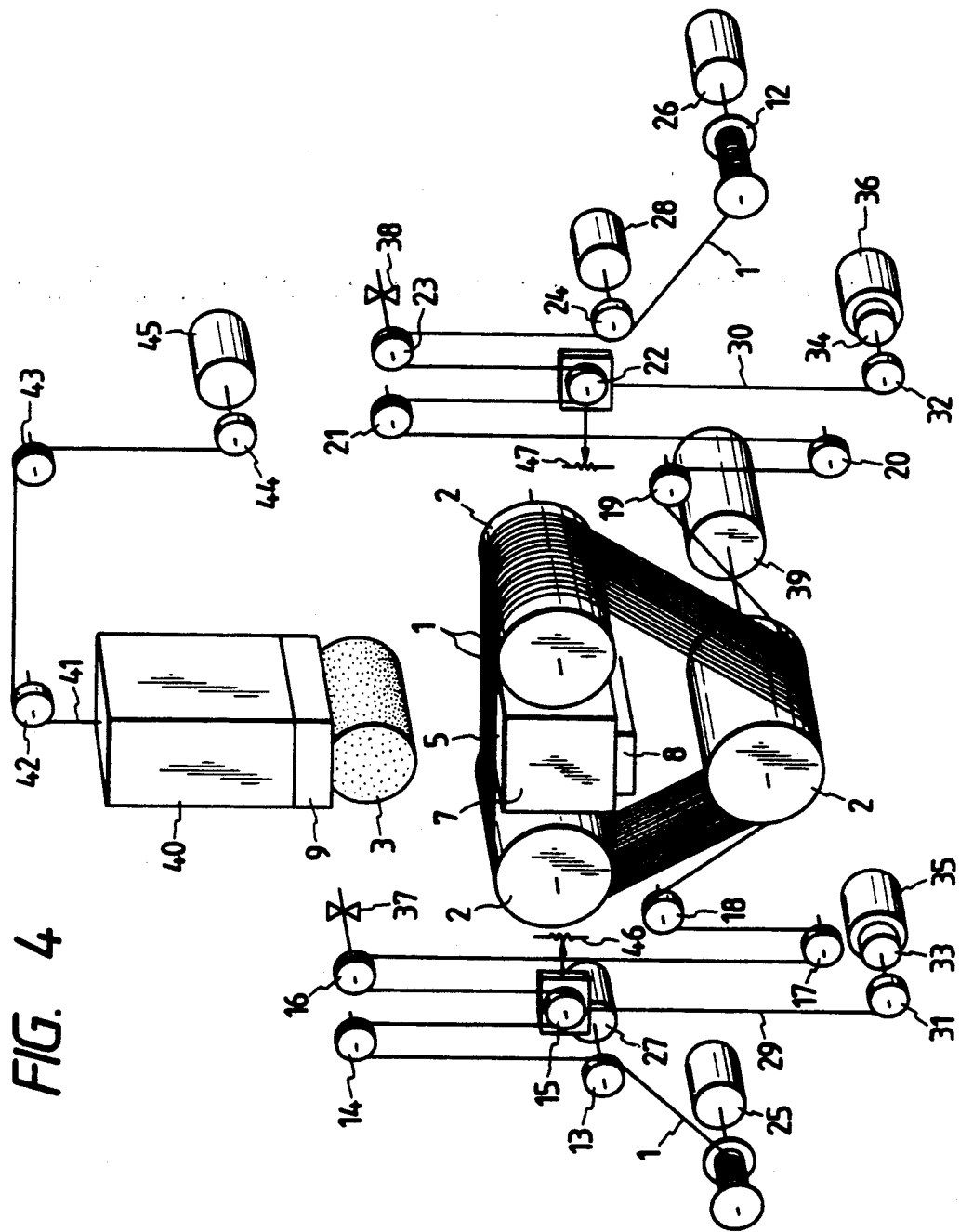
FIG. 4 is an explanatory diagram outlining the arrangement of a machining apparatus practicing a method of cutting a brittle material according to this invention.
Figure 5:
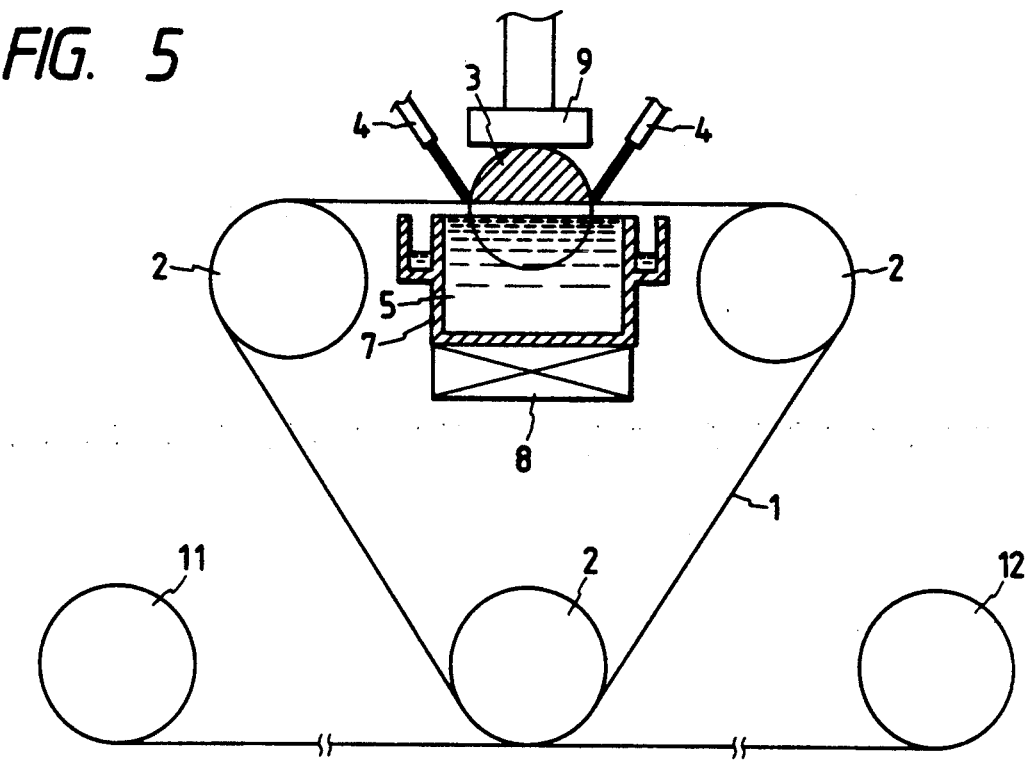
FIG. 5 is an explanatory diagram for a description of the principle of the method of the invention.

FIGS. 4 and 5 show the arrangement of a machining apparatus which practices a method of machining a brittle material according to the invention.

As shown in FIG. 4, a wire 1 is supplied from a wire supply reel 11, and the wire 1 thus supplied is extended over a traverse roller 13, a guide roller 14, a dancer roller 15 and guide rollers 16, 17 and 18 and then wound over a plurality of grooved rollers 2 (three rollers 2 in FIG. 4). The wire thus wound is laid over guide rollers 19, 20 and 21, a dancer roller 22, a guide roller 23 and a traverse roller 25 and wound on a wire take-up reel 12. The wire supply reel 11 and the wire take-up reel 12 are continuously rotated by reel motors 25 and 26 in a wire supply direction and in a wire take-up direction, respectively, at constant speed. Traverse motors 27 and 28 are provided for the traverse rollers 13 and 24 to reciprocate the latter 13 and 24 axially thereby to shift the wire 1 in the widthwise directions of the reels 11 and 12, whereby the wire 1 is wound flat over the rollers 2. In order to absorb the shift of the wire during its reciprocation at the machining position, the dancer rollers 15 and 22 are suspended by the wire 1 in such a manner that they are movable vertically, and they are pulled downwardly by tension wires 29 and 30 with predetermined tensile forces, respectively. The predetermined tensile forces are detected by tension sensors 37 and 38 provided, for instance, at the guide rollers 14 and 23, respectively. More specifically, the tensile forces are detected as the radial loads of the axes of the guide rollers 14 and 23, respectively. The tensile forces thus detected are adjusted to aimed values by means of tension rollers 31 and 32, electromagnetic powder clutches 33 and 34, and tension motors 35 and 36, respectively. Displacement sensors 46 and 47 are provided at the dancer rollers 15 and 22, respectively.

A main motor 39 drives the lower grooved roller 2 in a reciprocation mode, so that the wire 1, while being reciprocated between the two upper grooved rollers 2 and 2, is intermittently moved on. A workpiece 3 to be machined is pushed against the wires 1 between the grooved rollers 2 and 2 from above. The workpiece 3 is secured to the lower end of a workpiece holder 9 for instance by bonding. The workpiece holder 9 is secured to a Z-axis slider 40, and it is movable vertically by means of a suspending wire 41, guide rollers 42, 43 and 44, and a Z-axis motor 45. In machining the workpiece 3, the Z-axis motor 45 lowers the workpiece holder 9 gradually as the machining operation advances.

On the other hand, lapping free abrasive grains are mixed with a machining solution 5, so that the latter is placed in slurry state. As shown in FIG. 5, the machining solution in slurry state is supplied through nozzles 4 provided above the workpiece 3 to a machining position. The machining solution thus supplied is stored in a machining solution pooling vessel 7 below the workpiece 3, and then returned into a machining solution supply tank while flowing over the machining solution pooling vessel 7. The machining solution may be recovered through the lower portion of the pooling vessel 7. An ultrasonic device 8 is provided under the pooling vessel 7.

Figure 6:
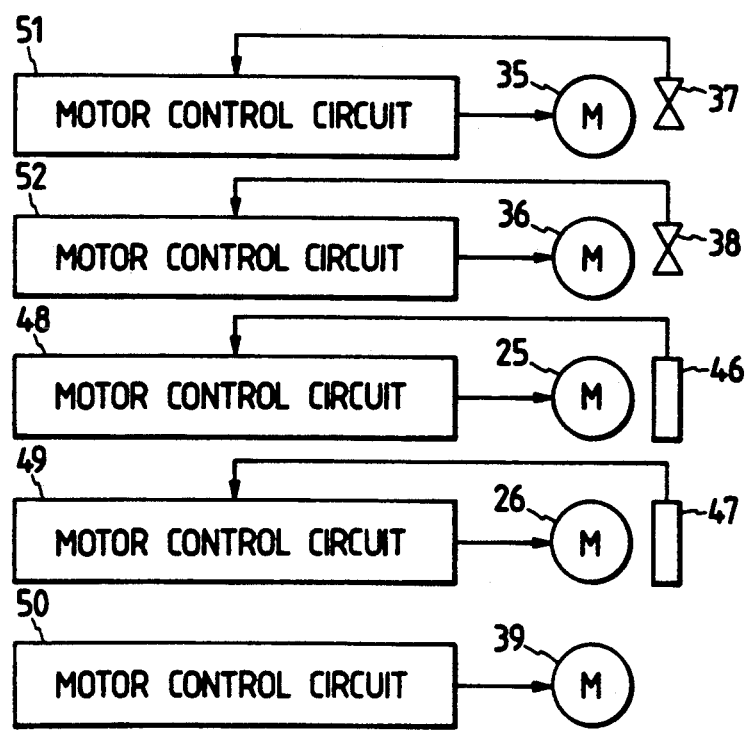
FIG. 6 is an explanatory diagram, partly as a block diagram, showing motor control circuits employed in the method of the invention.

As shown in FIG. 6, motor control circuits 48, 49, 50, 51 and 52 are connected to the motors 25, 26, 39, 35 and 36, respectively. The motor control circuits 48, 49, 51 and 52 are connected to the displacement sensors 46 and 47 and the tension sensors 37 and 38, respectively, for feedback control.

Figure 7:
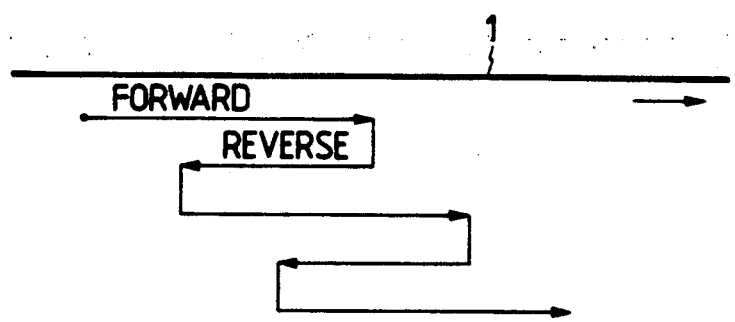
FIG. 7 is an explanatory diagram showing the reciprocation of a wire in the method of the invention.

The motor control circuit 50 operates to turn the driving grooved roller 2 in forward and reverse directions periodically, thereby to move the wire 1 in a reciprocation mode. That is, the main motor 39 is rotated as shown in FIG. 7. More specifically, the motor 39 is rotated in the forward direction for a certain period of time, and rotated in the reverse direction for a period of time shorter than the preceding period of time, thus completing one cycle of rotation. This cycle of rotation is repeatedly carried out. As a result, the wire 1, while being reciprocated, is moved from the wire supply reel 11 to the wire take-up reel 12. And, between the two upper grooved rollers 2 and 2, the wire cuts the workpiece 3 while being pushed against the latter 3.

In the workpiece cutting operation, the wire 1 is tensioned by the motor control circuit 51 and the tension motor 35 on the wire supply side, and by the motor control circuit 52 and the tension motor 36 on the wire take-up side. Accordingly, although being reciprocated as described above, the wire 1 is tensioned as required in moving backwards and forwards, and in changing the direction of movement, on the wire supply side and on the wire take-up side. The tensile forces given to the wire 1 can be determined to suitable target value by the motor control circuits 51 and 52.

In reciprocation of the wire 1, the motors 25 and 26 are rotated in the wire supply direction and in the wire take-up direction, respectively, so that the wire 1 is moved on. The shift of the wire 1 which may be caused at the machining position during reciprocation is absorbed by the vertical movement of the dancer rollers 15 and 22. Accordingly, the wire supply reel 11 and the wire take-up reel 12 may turn only in the wire supply direction and in the wire take-up direction. When the dancer rollers 15 and 22 are moved vertically, the motor control circuits 51 and 52 for tension generation operate to apply predetermined forces to the dancer rollers 15 and 22 substantially irrespective of the displacement thereof. Therefore, the wire 1 is tensioned correctly at all times.

When the amount of feed of the wire 1 from the wire supply reel 11 differs from the predetermined value, the dancer roller 15 is raised according to the difference. The position of the dancer roller 5 thus raised is detected by the displacement sensor 46 and applied, as a feedback data, to the motor control circuit 48. As a result, the speed of the motor 25 is increased according to the difference of the amount of feed from the predetermined value. Similarly, when the amount of winding the wire 1 by the wire take-up roller 12 is decreased, the dancer roller 22 is gradually lowered during vertical movement, and the position of the dancer roller 22 thus lowered is detected by the displacement sensor 47. The position thus detected is applied, as feedback data, to the motor control circuit 49, as a result of which the wire take-up motor 26 is accelerated as much to wind the wire 1. In this operation, in order to realize smooth reciprocation, the motor control circuits (28 and 29) perform smooth speed control; that is, they control the wire supplying motion on a sine or cycloid curve.

Figure 8:
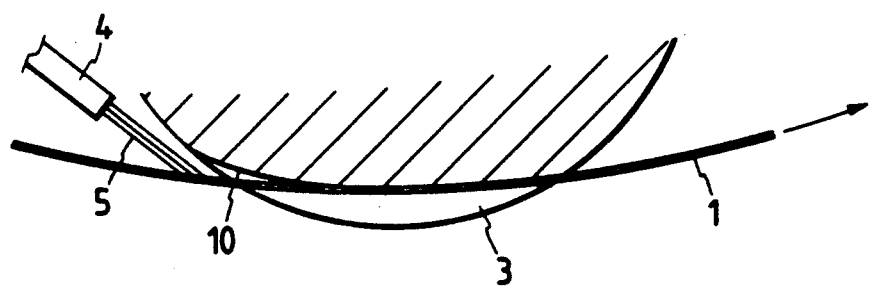
FIG. 8 is an enlarged view showing a portion of a workpiece which is cut according to the method of the invention.

When the wire 1 is intermittently fed while being reciprocated, the workpiece 3 is pushed against the wire from above. Therefore, the wire 1 applies the abrasive grains of the machining solution to the workpiece 3 while being reciprocated, so that the workpiece 3 is cut by lapping. During the cutting operation, as shown in FIG. 8 a wedge-shaped space 10 is formed between the wire 1 and the workpiece 3 downstream of the wire as viewed in the direction of movement, and the machining solution 5 goes into the wedge-shaped space 10 thus formed, so that the abrasive grains are sufficiently applied to the cutting part. When the wire 1 is moved in the opposite direction during reciprocation, a wedge-shaped space 10 is formed on the other side. That is, the wedge-shaped space 10 is formed between the wire and the workpiece downstream of the wire 1 as viewed in the direction of movement thereof, at all times. Thus, as the wire 1 is reciprocated, the wedge-shaped spaces are formed on both sides of the cutting part, thus allowing the cutting part to receive the machining solution 5 sufficiently. As a result, the workpiece can be uniformly cut.

The machined portion of the workpiece, namely, a plurality of thin plates are kept immersed in the machining solution 5 in the machining solution pooling vessel 7. The machining solution 5 in the vessel 7 being oscillated by the ultrasonic device 8 is fluidized.

As was described above, the abrasive grains can readily go into the wedge-shaped space 10 between the wire 1 and the workpiece 3, and therefore the machining accuracy and efficiency are sufficiently improved even if the machined portion of the workpiece is not immersed in the machining solution 5. The workpiece 3 is pushed against the wire 1 from above while being suspended, and therefore the plurality of thin plates formed by machining will not be inclined by their own weights, and accordingly the gaps between the thin plates are maintained uniform at all times. In addition, the thin plates are immersed in the machining solution 5 in the machining solution pooling vessel 7, so that they are positively free from the difficulty that the abrasive grains are stayed in and stuck to the gaps. Accordingly, the probability that the machined surface is scratched or cracked in removal of the workpiece from the wires 1 is smaller by 4 to 5% than that in the conventional machining method. Moreover, the method of the invention can substantially prevent the machined surfaces from being smudged by the abrasive grains.

The ultrasonic device 8 on the bottom of the machining solution pooling vessel 7 oscillates the machining solution 5 in it, so that foreign matters such as chips from the workpiece 3 or particles formed by the friction of the wire 1 and the rollers are separated from the abrasive grains, whereby the machining solution is prevented from being deteriorated in cutting capacity, and the service life of the machining solution is lengthened about three times. Furthermore, since the machining solution 5 in the vessel 7 is kept fluidized by the ultrasonic device 8, the difficulty that the abrasive grains stay in and stick to the gaps between the thin plates formed by machining the workpiece can be effectively eliminated.

In the above-described embodiment, the machining solution 5 is oscillated at the machining solution pooling vessel 7; however, it should be noted that the invention is not limited thereto or thereby. That is, the ultrasonic oscillation may be given to the machining solution at any point in the machining solution circulation route. The ultrasonic oscillation will clean the machined portion of the workpiece; however, it may be cleaned more effectively by a method in which, after the workpiece has been machined, the machining solution 5 is discharged from the apparatus, and a machining solution including no free abrasive grains is supplied thereinto.

Furthermore, in FIG. 4, the workpiece 3 pushes the wires 1 from above; however, the same effect can be obtained by holding the workpiece 3 stationary and pushing the wires 1 against it from below.

While there has been described in connection with the preferred embodiment of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. In an apparatus for cutting a workpiece comprising brittle material in which a wire (1) is supplied from a wire supply reel (11), wound over a plurality of grooved rollers (2), and wound on a wire take-up reel (12), and while, between said grooved rollers (2), said wire (1) and said workpiece (3) comprising brittle material are pushed against each other, a machining solution (5) containing abrasive grains is supplied to said workpiece, to cut said workpiece, a method of cutting said workpiece comprising brittle material comprising the steps of:

pushing said workpiece (3) downwardly against said wire (1) from above with a pushing member positioned above said workpiece, immersing the substantially entire cut portion of said workpiece in a machining solution in a machining solution pooling vessel (7) provided below said workpiece (3); and maintaining the cut portion of said workpiece substantially in its entirety in said machining solution in said machining solution pooling vessel (7) while said workpiece is being cut with the portion of the workpiece presently being cut not submerged in the machining solution, thereby preventing said abrasive grains from adhering to said cut portion of said workpiece.

2. A method as claimed in claim 1, further comprising the steps of applying ultrasonic waves to said machining solution (5) during cutting, said ultrasonic waves freeing abrasive grains lodged in gaps formed in said cut portion of said workpiece.

3. A method as claimed in claim 2, in which an ultrasonic device (8) generating said ultrasonic waves is provided for said machining solution pooling vessel (7) disposed below said workpiece (3).

* * * * *